United States Patent [19]

Johnson et al.

[11] Patent Number: 4,838,756

[45] Date of Patent: Jun. 13, 1989

[54] HYDRAULIC SYSTEM FOR AN INDUSTRIAL MACHINE

[75] Inventors: Steven H. Johnson; Lary L. Williams, both of Dubuque, Iowa

[73] Assignee: Deere & Company, Moline, Ill.

[21] Appl. No.: 220,357

[22] Filed: Jul. 15, 1988

Related U.S. Application Data

[63] Continuation of Ser. No. 016,319, Feb. 19, 1987, abandoned.

[51] Int. Cl.[4] .............................................. F16D 31/02

[52] U.S. Cl. .................................... 414/699; 414/694; 60/429; 60/452

[58] Field of Search ................................ 414/694, 699

[56] References Cited

U.S. PATENT DOCUMENTS

| | | | |
|---|---|---|---|
| 3,366,064 | 1/1968 | Stephens et al. | 60/452 X |
| 3,406,850 | 10/1968 | Hancox | 60/452 X |
| 3,935,706 | 2/1976 | Stevens | 60/452 X |
| 4,030,623 | 6/1977 | Bridwell et al. | 60/421 |
| 4,087,968 | 5/1978 | Bianchetta | 60/452 X |
| 4,335,557 | 6/1982 | Lobmeyer et al. | 60/421 |
| 4,415,050 | 11/1983 | Nishida et al. | 180/6.48 |
| 4,420,937 | 12/1983 | Naruse et al. | 60/452 X |
| 4,449,366 | 5/1984 | Sato et al. | 60/452 X |
| 4,476,679 | 10/1984 | Sato | 60/429 X |
| 4,517,800 | 5/1985 | Karakama et al. | 60/452 X |
| 4,518,321 | 5/1985 | Schnieder et al. | 60/452 X |
| 4,531,366 | 7/1985 | Moriaya et al. | 60/421 |
| 4,534,268 | 8/1985 | Yagyu et al. | 91/6 |
| 4,553,904 | 11/1985 | Ruseff et al. | 60/452 X |
| 4,561,341 | 12/1985 | Aikawa | 91/6 |

FOREIGN PATENT DOCUMENTS

| | | | |
|---|---|---|---|
| 0041538 | 3/1984 | Japan | 414/699 |

*Primary Examiner*—Frank E. Werner
*Assistant Examiner*—William M. Hienz

[57] ABSTRACT

An excavator has a number of different hydraulically powered functions that are controlled by a closed center hydraulic system that features a pair of variable displacement, engine driving hydraulic pumps, the displacement of which is responsive to the demands of the system. The flow to the various hydraulic motors is controlled by pilot operated load sensing control valves that direct fluid pressure to a load sensing line when one of the hydraulic motors in the system is being operated. The load sensing line is connected to the control system of the pumps to place the pumps in stroke when a flow of pressurized fluid is required. The flow of the load sensing pressure to the controls for one of the pumps can be optionally disconnected to place said pump in a standby condition and thereby reduce the flow capacity of the hydraulic system at the option of the operator.

2 Claims, 2 Drawing Sheets

HYDRAULIC SYSTEM FOR AN INDUSTRIAL MACHINE

This application is a continuation of application Ser. No. 07/016,319, filed Feb. 19, 1987, now abandoned.

BACKGROUND OF THE INVENTION

This invention relates to a hydraulic power and control system for an industrial machine, such as a hydraulically powered excavator or the like.

Hydraulic excavators conventionally utilize hydraulic cylinders to control the position of the main excavator boom, to control the position of the arm at the end of the boom, and to control the position of the bucket at the end of the arm. Also, a hydraulic motor is conventionally utilized to rotate the excavator body that carries the boom on the undercarriage and it is also known to use a pair of independently controlled hydraulic motors to drive the opposite tracks of the machine's undercarriage to propel and steer the machine. Typically, such hydraulic systems have been open center type systems.

Since more than one of the hydraulically powered functions on such excavators are normally being operated at the same time, it is necessary that the hydraulic systems have a relatively high flow capacity. For that purpose, it is known to provide a pair of hydraulic pumps to supply fluid pressure for the system, since the smaller pumps are more readily available and normally are cheaper per unit of capacity than a single large pump. Moreover, the smaller pumps can be independently replaced at a much cheaper cost.

While high flow capacity is a desirable feature generally, it can be a detriment when an excavator is being used in an operation that requires relatively slow, accurately controlled movement of the various functions, such as when an excavator is being used to lay pipe, or unload trucks, or operating in close proximity to a structure or workers.

SUMMARY OF THE INVENTION

According to the present invention, a multi-pump, closed center, pressure on demand system is provided for an excavator or the like.

An important feature in the invention resides in the provision of means for reducing the flow rate of the system at the option of the operator. More specifically, a valve is provided to optionally shut off the load sensing circuit for at least one of the pumps, thereby causing the pump to destroke at the option of the operator.

DESCRIPTION OF THE PREFERRED EMBODIMENT

Figure 1:
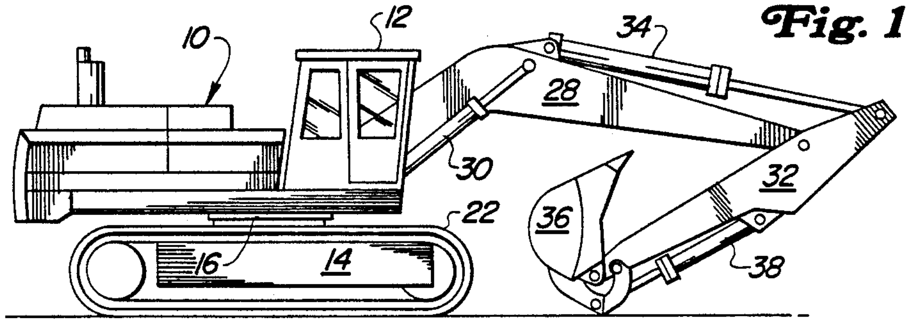
FIG. 1 is a side elevation view of an excavator embodying the invention.

The invention is embodied in a hydraulic excavator that is shown generally in FIG. 1. The excavator includes a main body 10, having an operator's cab 12 at one end and mounted on an undercarriage 14 by means of a swing pivot 16. The swing pivot is also schematically shown in FIG. 2, and the body 10 is rotatable through a full circle relative to the undercarriage 14 on the pivot 16, the swinging of the body being accomplished by a hydraulic motor 18 that drives a gear train 20 engageable with a large ring gear in the pivot mechanism to rotate the body 10.

The undercarriage 14 includes a pair of tracks 22 on opposite sides of the undercarriage, and the respective tracks are driven by hydraulic motors 24 and 25 through respective clutches 26 and 27 and planetary reduction gearing (not shown) in the well known manner.

The excavator includes a large boom 28 that extends from the body 10 and is swingable in a vertical arc by actuation of a pair of boom cylinders 30. A dipper stick or arm 32 is swingably mounted on the outer end of the boom and its position is controlled by a hydraulic cylinder 34. At the lower end of the dipper stick or arm 32, there is mounted a conventional excavator bucket 36 that is swingable relative to the arm 32 by means of a hydraulic cylinder 38. All of the above represents more or less conventional construction, and the various hydraulic functions are all schematically shown on FIG. 2.

An internal combustion engine 40 is mounted in the body 10 and has an output shaft 42 that drives a pair of identical hydraulic pumps 44 and 46. The pumps 44 and 46 are identical variable displacement pumps and respectively have stroke control systems 48 and 50. While only two pumps are illustrated in the preferred embodiment, it is to be understood that three or more commonly driven and connected pumps could be included in the system. Since the stroke control system for the two pumps is essentially the same, only the stroke control system 48 for the pump 44 will be described in detail.

The displacement of the pump 44 is controlled by a stroke control cylinder 52 that is actuated by a change of pressure in a destroke line 54, the pressure in the line 54 acting against a spring in the stroke control cylinder 52 to destroke the pump. When the pressure is exhausted from the line 54, the spring moves the piston of the stroke control cylinder 52 toward full displacement of the pump.

The pump destroke line 54 is connected to a horsepower control valve 56, which connects the line 54 to a load sensing spool valve 58 when the horsepower control valve 56 is in the position illustrated in FIG. 2. The load sensing spool valve 58 in turn connects the destroke line 54 to a drain line 60 when the valve 58 is in the illustrated position, and the drain line 60 is connected to a line 61 that dumps into the hydraulic systems reservoir 62.

Figure 2A:
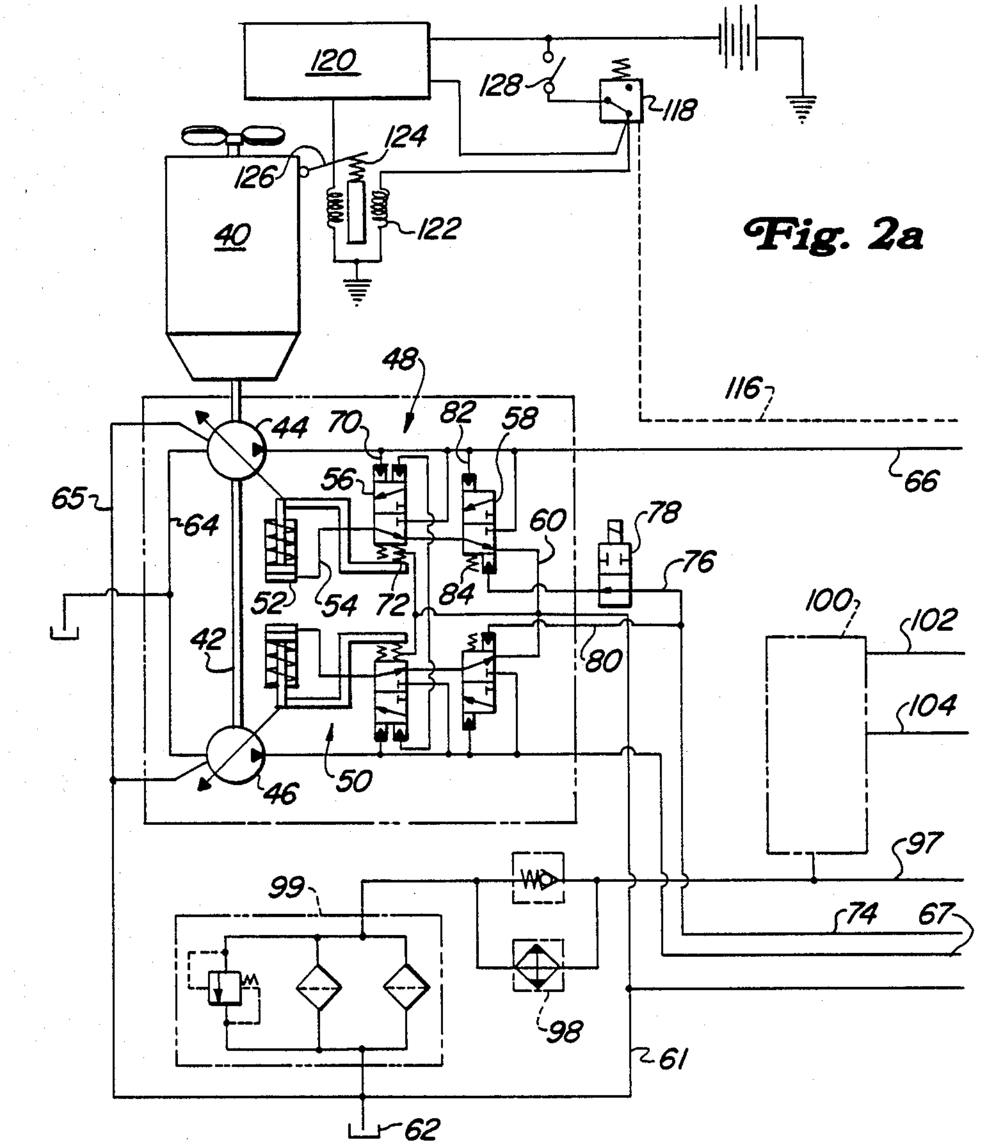
FIG. 2 is a schemetic view of the hydraulic system for controlling the various hydraulically powered functions on the excavator, the figure being divided into sections 2*a* and 2*b* on separate sheets of drawing in order to afford enough space for the hydraulic system.
Figure 2B:
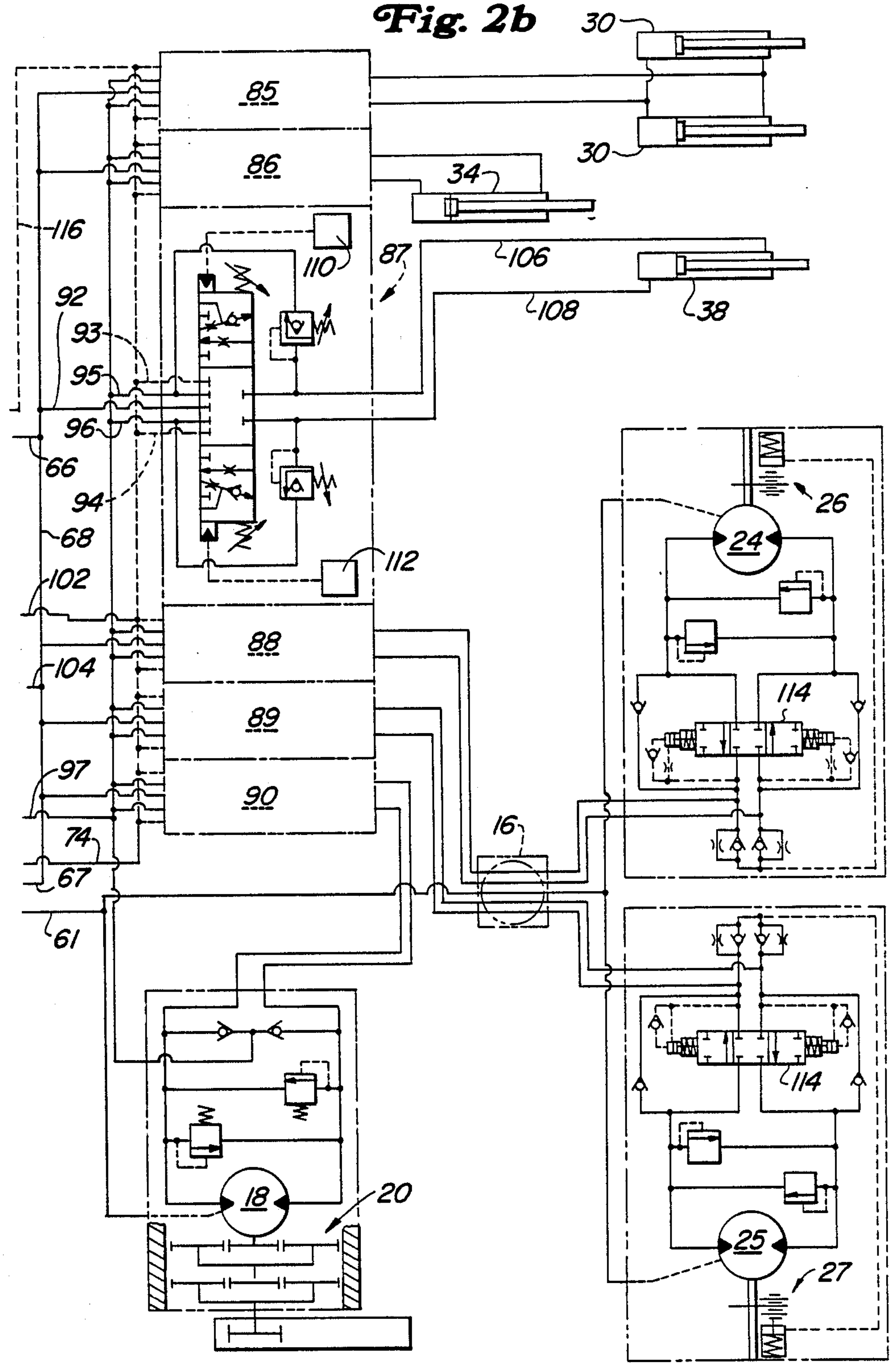

The pumps 44 and 46 include inlet lines 64 that draw fluid from the reservoir 62 and also leakage lines 65 that dump pump leakage back to the reservoir 62. The pump 44 has an outlet line 66 and the pump 46 has an outlet line 67 that are connected to a common outlet line 68, which is illustrated on FIG. 2*b*, while the pumps and their respective controls are illustrated in FIG. 2*a*. Referring back to FIG. 2*a*, the outlet line 66 is connected to one end of the horsepower control valve 56 via a pilot line 70, and movement of the control valve 56 is caused by said pilot line pressure working against springs 72. As is apparent, if pressure in the outlet line 66 starts to exceed a certain value that would overload the engine, the horsepower control valve shifts downwardly in FIG. 2 to meter pressurized fluid from the outlet line 66 back to the destroke line 54, thereby reducing the pump displacement and thereby reducing the load on the engine.

A load sensing line 74 is connected to the load sensing spool valve 58 for the motor 44 through an on-off type solenoid actuated valve 78, that is controlled by the operator by a conventional electric switch at the operator's cab 12. The line 74 is connected to the load sensing spool valve for the control system 50 directly by a hydraulic line 80, so that the pressure in the load sensing line 74 is always communicated to one end of the load sensing spool valve for the motor 46 while it is optionally connected to the valve 58 for the other pump 44. As is apparent, when the pressure in the load sensing line 74 is communicated to the valve 58 through the solenoid valve 78, it works against the pressure in the pump outlet line 66 that is communicated to the other end of the valve 58 by means of a pilot line 82. The pressure in the line 76 plus the force of a spring 84 are sufficient to shift the valve to the position shown in FIG. 2*a* when the pressure in the line 74 reaches a certain value, and, as is apparent, when the system is sufficiently loaded to open the valve 58 as shown but not overloaded so that the valve 56 stays open, the pump destroke line 54 is connected to the reservoir to shift the pump 44 to its maximum displacement.

Since the line 80 from the load sensing line 74 to the load sensing valve for the motor 46 is always connected to the valve, the pump responds to pressure in the load sensing line 74 to place the pump in stroke when the pressure in the load sensing line 74 indicates a pressure demand. The same is normally true for the control system for the other motor 44, except that the operator by shifting the valves 78 to its closed condition, can shut off the connection of the load sensing line 74 to the valve 58, so that pressure in the line 66 shifts the valve 58 to connect the outlet line 66 to the pump destroke line 54, which thereby destrokes the pump. Thus, the operator can optionally maintain the pump 44 in its destroked condition regardless of the demand indicated by the pressure in the load sensing line 74.

The common outlet line 68 for the two pumps serves as a common input for a bank of control valves 85, 86, 87, 88, 89, and 90 that respectively control the flow of pressurized fluid to and exhaust fluid from the boom cylinders 30, the arm cylinder 34, the bucket cylinder 38, the drive motor 24, the drive motor 25, and the swing control motor 18. The valves 85-90 are essentially identical, and, therefore, only the valve 87 for the bucket control cylinder 38 will be described in detail. The valves are of the type known as load sensing control valves, and such valves are available from the Linde Hydraulics Company of Canfield, Ohio, as well as others. The valve 87 is connected to the common pump outlet line 68 by a hydraulic line 92 and a pair of load sensing lines 93 and 94 connect the valve to the main load sensing line 74. Similarly, a pair of drain lines 95 and 96 connect the valve to the main drain line 97 that connects the entire valve bank to the hydraulic reservoir 62 through an oil cooler 98 and an oil filter system 99, both of which are of known construction.

A relief valve system 100, also of conventional construction, is connected to the load sensing line 74 by a line 102 and to the common outlet line 68 by a line 104, the relief valve package being operable to dump the lines 102 and 104 to the reservoir line 97 when certain pressures are exceeded.

The valve 87 is connected to the bucket control cylinder by lines 106 and 108 and is shiftable in opposite directions by means of pilot operated control systems 110 and 112, of known construction. As is apparent, when the valve is shifted in one direction from the neutral position as shown, the pressurized inlet line 92 is connected to the valve outlet line 106, and the pressure directed to the cylinder 38 is also communicated to the load sensing line 93. The other end of the cylinder is connected to the reservoir through the line 108 and the valve 87. Conversely, when the valve is shifted in the opposite direction, it connects the pressure line 92 to the valve outlet line 108 while simultaneously communicating that pressure to the load sensing line 94, and the line 106 is connected to the reservoir via the drain line 95.

The swing motor 18 is provided with conventional check and pressure relief valves, and in addition to the control valves 88 and 89 for the track motors 24 and 25, metering valves 114 are provided to meter fluid to the respective motors. Since the present invention is not specifically directed to the hydraulic circuitry associated with the respective motors, the various relief and check valves are not described in detail.

The load sensing line 74 is also connected to a sensing line 116 that provides the input to a pressure actuated switch 118 of conventional construction. A predetermined pressure in the load sensing system and consequently the pressure in line 116 operates to hold the switch 118 in an open condition. However, when the pressure in the line 116 falls below a predetermined point as a result of a lack of load in the system, a spring in the switch 118 closes the switch to connect the electrical system of the excavator to an automatic timer 120. The timer is of known construction and can be set to provide varying time delays, the preferable delay being in the range of 5 to 6 seconds. After the preset time delay has occurred, the timer actuates to complete the electrical circuit to a solenoid 122. The solenoid 122 is a dual coil type, the first or holding coil being immediately energized when the switch 118 closes, while the second coil, which causes the solenoid to shift against the bias of a spring 124, is energized only through the timer 120. Actuation of the solenoid 122 shifts a fuel injection pump lever 126 to throttle back the engine. A manually actuated switch 128 is preferably provided in the electrical system to disconnect the system from the power source.

In operation, the excavator operator normally sets the engine throttle at a relatively high setting to provide adequate power to drive the pumps 44 and 46. If, however, the operator interrupts the operation of the machine, such as between truck loads, the entire control valve bank would be de-activated and the pressure in the load sensing line 74 would fall off. The reduced pressure would cause the pressure actuated switch 118 to close, and presuming that the switch 128 closed to actuate the automatic idle system, electric energy would be directed to the timer 120. After the preset time delay, the power would be directed to the solenoid 122, to shift the solenoid and thereby throttle back the engine. Thus, after an appropriate interval when the hydraulic functions are not being operated, the engine is automatically throttled back to save on engine wear and fuel. Obviously, the operator can de-activate the automatic idle system by simply opening the switch 128.

Also, in operation, the operator normally maintains the valve 78 in its open condition, as shown. As previously described, this allows load sensing pressure to be supplied to both pump displacement control systems 48 and 50 so that the displacement of both pumps 44 and 46 increases in response to load. However, if the operator wishes to reduce the flow rate of the system and thereby provide finer control of the various motors, he simply closes the valve 78 so that the load sensing pressure is not provided to the control system 48 for the motor 44, whereby the motor 44 is maintained at minimum displacement.

I claim:

1. In an industrial machine having a plurality of engine driven variable displacement hydraulic pumps with a common associated reservoir, and a common outlet line, a plurality of hydraulic motors for respectively operating different machine functions, and control valve means for controlling the flow of pressurized fluid from the outlet line to the respective motors and from the motors to the reservoir, the improvement comprising: a load sensing conduit; load sensing means associated with each control valve means for connecting the outlet line to the load sensing conduit when one of the motors is connected to the outlet line; a stroke control means operatively connected to each pump and to the load sensing conduit for increasing the displacement of the respective pumps when the pressure in the load sensing conduit exceeds a predetermined value; and shut-off valve means in the connection between the load sensing conduit and the stroke control means for only one of the pumps and selectively shiftable between open and closed positions, whereby said one pump does not increase its displacement in response to an increase in pressure in the load sensing conduit when the shutoff valve is in its closed position.

2. The invention described in claim 1 wherein the machine is a hydraulically powered excavator having a shiftable boom, a shiftable arm at the outer end of the boom and a shiftable bucket at one end of the arm, the motors including hydraulic cylinders respectively actuatable to shift the boom, the arm and the bucket, at least three control valve means being provided to respectively control said cylinders and connect the pressurized side of the cylinders to the load sensing conduit.

* * * * *